United States Patent
Jiang et al.

(10) Patent No.: US 11,018,581 B2
(45) Date of Patent: May 25, 2021

(54) METHODS AND DEVICES FOR OPERATING CONVERTERS

(71) Applicant: Avage Technologies International Sales PTE. Limited, Singapore (SG)

(72) Inventors: Yongjie Jiang, Fort Collins, CO (US); Kevin Vannorsdel, Erie, CO (US); Jay Ackerman, Fort Collins, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 111 days.

(21) Appl. No.: 15/940,442

(22) Filed: Mar. 29, 2018

(65) Prior Publication Data

US 2019/0305679 A1 Oct. 3, 2019

(51) Int. Cl.
*H02M 3/158* (2006.01)
*H02M 1/08* (2006.01)
*H02M 1/00* (2006.01)

(52) U.S. Cl.
CPC .............. *H02M 3/158* (2013.01); *H02M 1/08* (2013.01); *H02M 2001/0025* (2013.01)

(58) Field of Classification Search
CPC . H02M 3/158; H02M 1/08; H02M 2001/0025
See application file for complete search history.

(56) References Cited

U.S. PATENT DOCUMENTS

| | | | | |
|---|---|---|---|---|
| 6,057,675 A | * | 5/2000 | Tateishi | H02M 3/1588 323/225 |
| 6,366,070 B1 | * | 4/2002 | Cooke | H02M 3/1588 323/222 |
| 7,733,072 B2 | | 6/2010 | Kanakubo | |
| 9,337,726 B2 | | 5/2016 | Lalithambika et al. | |
| 2004/0008013 A1 | * | 1/2004 | Gay | G05F 1/613 323/273 |
| 2008/0298089 A1 | * | 12/2008 | Reberga | H02M 3/33507 363/21.01 |
| 2009/0040791 A1 | * | 2/2009 | Qahouq | H02M 3/1588 363/21.01 |
| 2010/0289471 A1 | * | 11/2010 | Kasai | H02M 3/1588 323/282 |
| 2012/0182003 A1 | * | 7/2012 | Flaibani | H02M 3/156 323/284 |
| 2015/0200592 A1 | * | 7/2015 | Chang | H02M 3/156 323/271 |

* cited by examiner

*Primary Examiner* — Thienvu V Tran
*Assistant Examiner* — Bart Iliya
(74) *Attorney, Agent, or Firm* — Morgan, Lewis & Bockius LLP

(57) ABSTRACT

A converter includes a first circuit. The first circuit includes a first input that receives a power supply signal, a second input that receives a first signal, and a first output that outputs a second signal having an amplitude that is based on a frequency of the first signal. The first signal is based on an error value and a third signal, and the third signal is independent of feedback of the first circuit. The converter also includes a second circuit having a second output coupled to the second input and that outputs the third signal. The second circuit nonlinearly adapts the third signal based on the power supply signal and a reference signal.

16 Claims, 7 Drawing Sheets

METHODS AND DEVICES FOR OPERATING CONVERTERS

FIELD OF THE DISCLOSURE

Example embodiments are directed to methods and devices for operating converters, e.g., for buck converters.

BACKGROUND

Electronic devices such as mobile devices, microprocessors, and other low current devices utilize buck converters to convert a power supply voltage into an operating voltage of the particular device. Buck converters may operate in two states; a pulse width modulation (PWM) state for larger load currents and a pulse-frequency modulation (PFM) state for smaller load currents. However, transitioning between the PWM and PFM states can cause unwanted voltage ripple and reduced power conversion efficiency.

BRIEF DESCRIPTION OF THE DRAWINGS

The present disclosure is described in conjunction with the appended figures, which are not necessarily drawn to scale.

DETAILED DESCRIPTION

Buck converters according to example embodiments operate in pulse-width modulated (PWM) and pulse-frequency modulation (PFM) state, when the load currents are heavy and light, respectively. Example embodiments relate to controlling converters to achieve improved performance in voltage ripple and power conversion efficiency.

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments. Moreover, it should be understood that some or all elements of one example embodiment may be applied to one or more other example embodiments if desired.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

Figure 1:
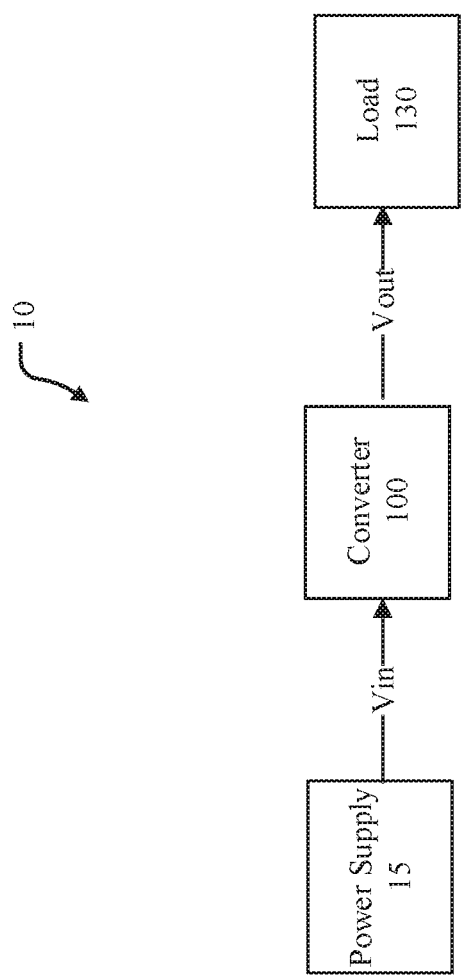
FIG. 1 illustrates a system according to at least one example embodiment.

FIG. 1 illustrates a system 10 according to at least one example embodiment. As shown in FIG. 1, the system 10 includes a power supply 15 that provides a power supply signal (e.g., voltage Vin). The converter 100 converts the power supply signal Vin into an output signal (e.g., voltage Vout). The converter 100 may be a dual mode buck converter having elements that are described in more detail below with reference to FIG. 2. The load 130 is powered by the output signal Vout, and as such, the load 130 may represent components of a mobile device or other electronic device that operate at a lower supply voltage than Vin. In other words, Vout may be less than Vin.

Figure 2:
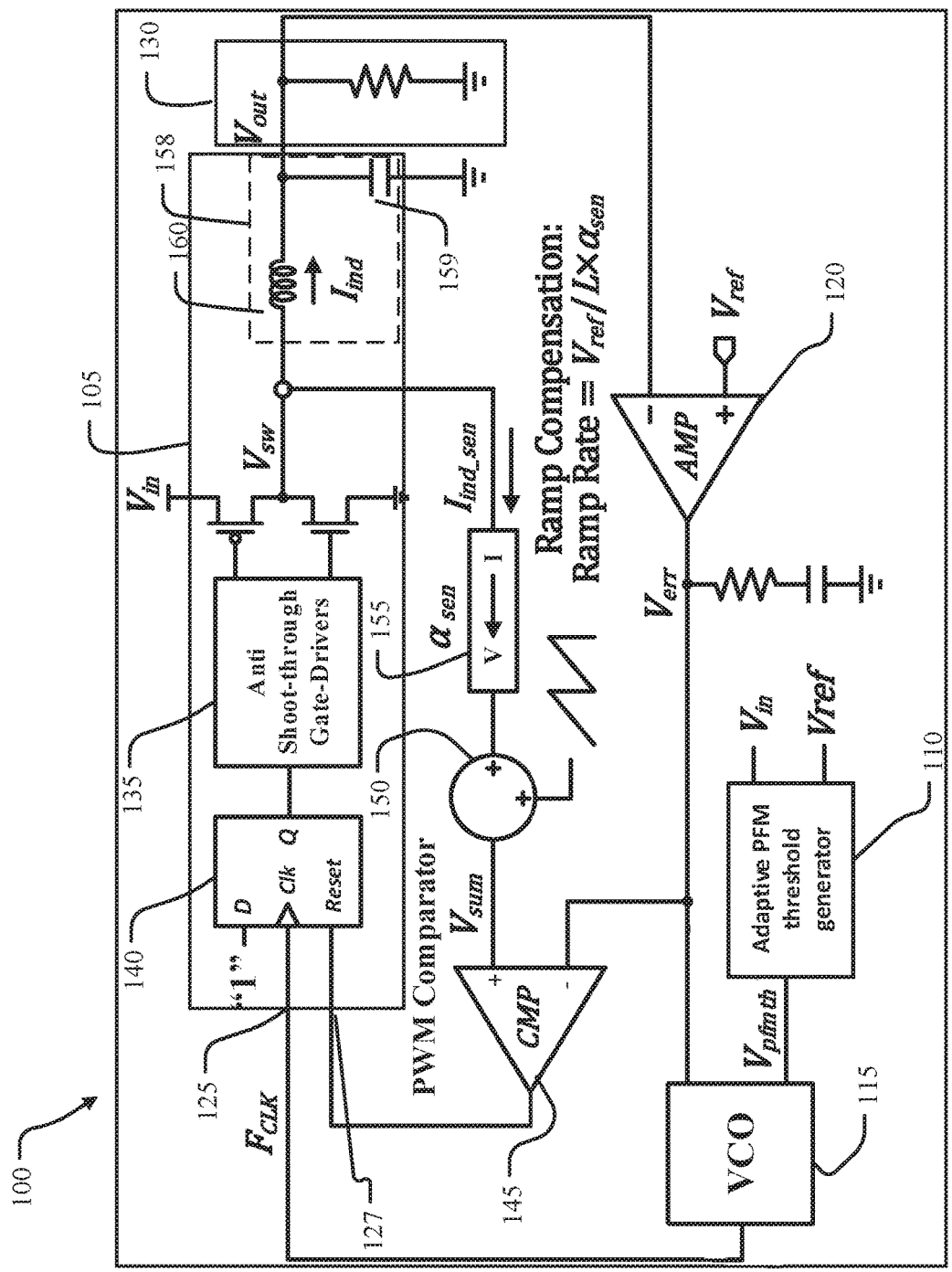
FIG. 2 illustrates the converter of FIG. 1 according to at least one example embodiment.

FIG. 2 illustrates the converter 100 of FIG. 1 according to at least one example embodiment.

As shown in FIG. 2, a converter (or buck converter) 100 includes a first circuit 105, a second circuit 110, a third circuit 115, error amplifier 120, comparator 145, an adder 150, and a current sensor 155 (implemented by any known circuitry for sensing current). The first circuit 105 includes a first input 125, a second input 127, a pair of transistors (e.g., PMOS and NMOS) connected to a power supply signal Vin, control circuitry 140 (illustrated in this example as flip-flop circuitry), gate drivers 135, and a filter circuit (or averaging filter) 158. The filter circuit 158 includes an inductance 160 and a capacitance 159, which have respective inductance and capacitance values that may be design parameters selected based on empirical evidence and/or preference. The gate drivers 135 may be implemented by any known circuitry that controls on/off states of the transistors to reduce (or alternatively, prevent) shoot-through. As shown in FIG. 2, the first circuit 105 is connected to the load 130.

The converter 100 is capable of operating in at least two modes; a pulse frequency modulation (PFM) mode or state and a pulse width modulation (PWM) mode or state. The modes may be controlled according to the first and second inputs 125, 127. For example, the control circuitry 140 may pass a combination of the first and second input signals (e.g., alternately pass) to the gate drivers 135 to control the pair of transistors. In any event, the signal Vsw at the output of the pair of transistors is converted to DC voltage signal Vout by the filter circuit 158. In at least one example embodiment, Vsw is a rectangular waveform.

In the PFM mode, the output signal or voltage Vout for powering the load 130 is based on the value of the power supply signal Vin and a frequency Fclk of the signal received at the first input 125. For example, a value of the output voltage Vout is proportional to the frequency of the signal at the first input 125. As shown in FIG. 2, the signal (Fclk) at the first input 125 is based on an output of the first circuit 115. Here, the third circuit 115 may be an oscillator circuit, such as a voltage controlled oscillator (VCO) implemented by any known circuitry for such oscillators. The output signal of the VCO 115 is based on an error signal Verr at a first input of the VCO 115 and a signal (Vpfmth) received from the threshold generator 110 at a second input of the VCO 115.

In both of the PFM and PWM modes, the error amplifier 120 generates the error signal Verr by calculating a difference between a reference signal Vref and a fed-back version of Vout. This error signal Verr may be referred to as a control signal or control voltage, and may represent a target current for inputting into the inductor 160. For example, if Vout is too low, then the converter 100 will send more current to inductor 160 as a result of Verr rising. If Vout is too high, then the converter will send less current to inductor 160 as a result of Verr lowering.

The second circuit 110 nonlinearly calculates an acceptable floor (or lowest desired value) for the error signal Verr as signal Vpfmth (a design parameter that may be set based on empirical evidence and/or preference). In other words, the second circuit 110 produces the signal Vpfmth, which represents a value of the control voltage Verr below which the switching frequency Fclk should be lowered and PFM mode should be entered. For example, when Verr is below Vpfthm, then the converter 100 switches from the PWM mode to the PFM mode. This calculated value of Vpfmth is based on the power supply signal Vin and the reference signal Vref only. That is, it should be appreciated that the signal Vpfmth is independent of the fed-back version of Vout. The ability of the second circuit 110 to generate Vpfmth in this manner may reduce voltage ripple of Vout and/or improve conversion efficiency of the converter 100.

An example cycle for the PWM mode of the converter 100 will now be described. For the converter 100, a cycle begins at each rising edge of Fclk. That is, when the input 125 receives a rising edge of Fclk, the control circuitry 140 causes the output Q to be a logical "1" in order to start a first stage of a cycle. Here, it should be understood that the output Q becomes "1" because the rising edge of Flck triggers the steady logical "1" at input D to transfer to output Q. As a result of a logical high value at output Q, Vsw becomes high. As Vsw becomes high (e.g., because the PMOS transistor is on and the NMOS transistor is off), current through the inductor 160 ramps up and that same current is sensed by current sensor 155 used for the signal Vsum.

During the first stage of the cycle, the error signal Verr and Vsum are compared at the comparator 145 until the comparator 145 detects a desired difference between Vsum and Verr. Upon detecting the desired difference, the comparator 145 outputs a logical "1" to input 127, which resets the control circuitry 140 by sending a logical "0" to the output Q to cause the converter 100 to enter a second stage of the cycle. In the second stage of the cycle, the logical "0" at output Q causes Vsw to be a logical low value (e.g., because the PMOS transistor is off and the NMOS transistor is on). Vsw remains at the logical low value until the cycle ends, which is when input 125 receives a next rising edge of Fclk. In view of the above, it should be understood that Vsw is driven high and low between each rising edge of Fclk.

It should be further understood that Vout in the PWM mode may be determined by the time between a rising edge of Fclk and a rising edge of the reset signal at input 127. For example, Vout may become larger as time periods between the rising edge of Fclk and the rising edge of the reset signal at input 127 become larger, and Vout may become smaller as the time periods become smaller.

In view of the above, it should be understood that the converter 100 may be a peak current mode control switching regulator or any number of other control topologies such as valley current mode control, average current mode control and others.

The functions of the first circuit 105, the second circuit 110, and the third circuit 115 are described in more detail below with reference to FIGS. 3-7.

Figure 3:
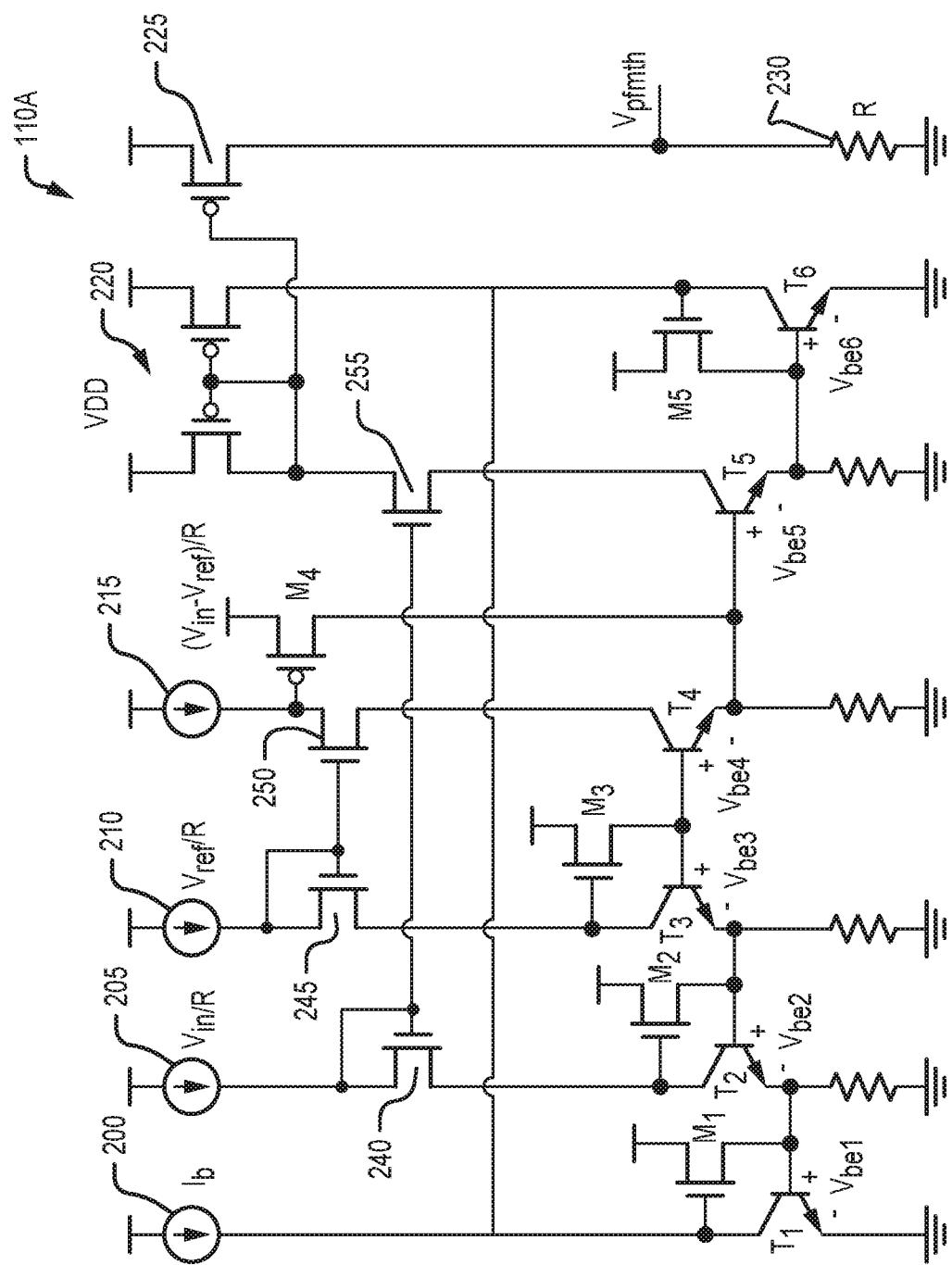
FIG. 3 illustrates the threshold generator (or second circuit) of FIG. 1 according to at least one example embodiment.

FIG. 3 illustrates the threshold generator (or second circuit) 110 of FIG. 1 according to at least one example embodiment.

As shown in FIG. 3, the threshold generator 110A may include current sources 200, 205, 210, and 215, and current mirror 220. The current source 200 may generate a current Ib having a desired current value. The current source 205 may generate a current having a value of Vin/R, where R is a resistance value of the resistance 230. Here, R an Ib in FIG. 3 (and FIGS. 4 and 5) are design parameters set based on empirical evidence and/or preference.

The current source 210 may generate a current having a value of Vref/R and the current source 215 may generate a current having a value of (Vin−Vref)/R. As shown, the current mirror 220 is powered by a supply signal VDD and although not explicitly shown, it should be understood that other components of FIG. 3 (e.g., transistors M1-M5, transistor 225) may be powered by a power supply signal such as VDD.

The threshold generator 110A includes a plurality of transistors 240, 245, 250, and 255 to control/regulate the outputs the collector-emitter voltages of bipolar transistors T2,T3,T4 and T5 so as to minimize the impact of their Early Voltage.

The threshold generator 110A also includes transistors M1-M5 that eliminate (or alternatively, reduce) the error due to low β common in CMOS processes used to manufacture the threshold generator 110A. The threshold generator 110A includes transistors T1, T2, T3, T4, T5, and T6, which allow the threshold generator 110A to perform multiplication and/or division functions to achieve a desired threshold signal Vpfmth.

The threshold generator 110A may include an output transistor 225 coupled to the resistance 230 having a resistance R. The output transistor 225 may serve as an amplification transistor for amplifying the signal Vpfmth. Here, resistance 230 and current Ib are used as scaling factors for the signal Vpfmth. For example, in at least one example embodiment, $$V_{pfmth} = \sqrt{\frac{V_{in} V_{ref}}{V_{in} - V_{ref}}} \times \sqrt{I_b R}.$$

In view the description of FIGS. 2 and 3, it should be appreciated that the threshold signal Vpfmth is nonlinearly adaptive to input and reference voltages Vin and Vref. It should be further appreciated that the charge distributed to Vout in every cycle of the converter 100 may be expressed by:

$$Q_{per\_c} = \frac{I_b R L}{(\alpha_{sen})^2},$$

which is independent of input and output voltages Vin and Vout. Because the charge per cycle is independent of Vin and Vout, the maximum voltage ripple in the PFM mode of the converter 100 may be expressed by:

$$\Delta V_{out} \approx \frac{Q_{per\_c}}{C_{out}} = \frac{I_b R L}{(\alpha_{sen})^2} \frac{1}{C_{out}}.$$

In other words, the voltage ripple is no longer a function of input and output voltages, and thus, the voltage ripple is reduced (or alternatively, eliminated) by, for example, a factor of about four compared to related art converters. In addition, the converter 100 exhibits improved conversion efficiency (e.g., 15%) over related art converters.

Figure 4:
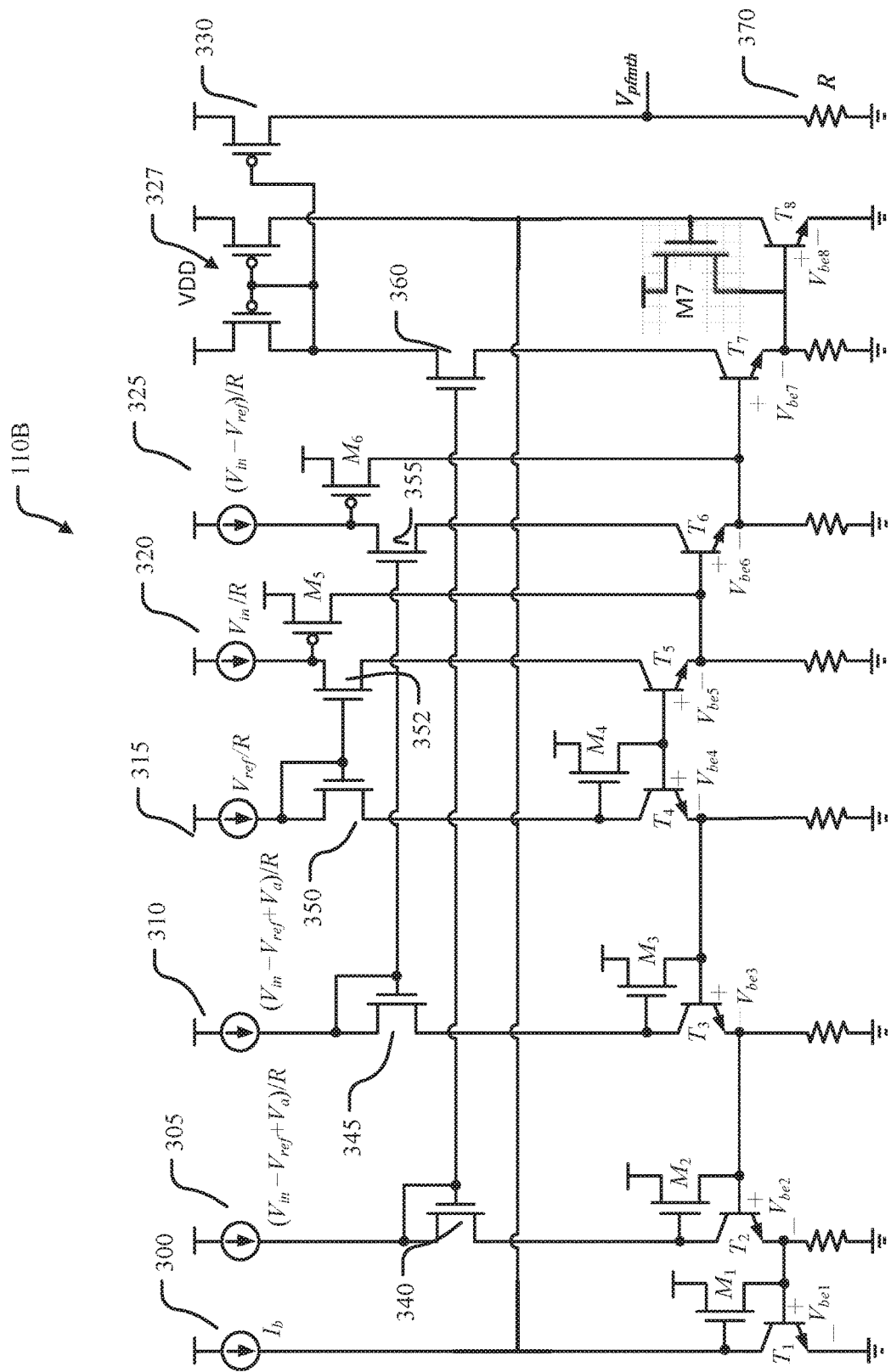
FIG. 4 illustrates the threshold generator (or second circuit) of FIG. 1 according to at least one example embodiment.

FIG. 4 illustrates the threshold generator (or second circuit) 110 of FIG. 1 according to at least one example embodiment.

FIG. 4 illustrates a nonlinear adaptive threshold generator 110B, which is similar to the threshold generator 110A in FIG. 3, but modified for a converter 100 that uses an arbitrary compensation slope:

$$K_{ramp} = \frac{V_a}{L \times \alpha_{sen}},$$

where Va is a voltage used to represent an arbitrary slope of the compensation ramp. As shown in FIG. 4, the threshold generator 110B includes current sources 300, 305, 310, 315, 320, and 325. Current source 300 outputs a desired current Ib. Current sources 305 and 310 each output a current equal to (Vin−Vref+Va)/R, where R is a resistance value of the resistor 370. Current source 315 outputs a current equal to Vref/R. Current source 320 outputs a current equal to Vin/R, and current source 325 outputs a current equal to (Vin−Vref)/R.

The threshold generator 110B includes a current mirror 327 and an output transistor 330 to provide amplification for the signal Vpfmth. As shown, the current mirror 327 is powered by a supply signal VDD and although not explicitly shown, it should be understood that other components of FIG. 4 (e.g., M1 to M7, transistor 330) may be powered by a power supply signal such as VDD.

Similar to the threshold generator 110A of FIG. 3, FIG. 4 shows that the threshold generator 110B includes a plurality of transistors 340, 345, 350, 352, 355, and 360 to control/regulate the collector-emitter voltages of bipolar transistors T2,T3,T4, T5, T6, T7, and T8 so as to minimize the impact of their Early Voltage.

Similar to the threshold generator 110A of FIG. 3, FIG. 4 shows that the threshold generator 110B includes transistors M1-M7 that eliminate (or alternatively, reduce) the error due to low β common in CMOS processes used to manufacture the threshold generator 110B. The threshold generator 110B includes transistors T1, T2, T3, T4, T5, T6, T7, and T8, which allow the threshold generator 110B to perform multiplication and/or division functions to achieve a nonlinearly adapted threshold signal Vpfmth.

In the PFM mode of the converter 100, the threshold generator 110B produces an accurate nonlinear function:

$$V_{pfmth} = \sqrt{\frac{(V_{in} - V_{ref} + V_a)^2 V_{ref}}{(V_{in} - V_{ref})V_{in}}} \times \sqrt{I_b R},$$

which makes the output voltage ripple of Vout in the PFM mode independent of input and output voltages Vin/Vout even when an arbitrary compensation slope is used.

Figure 5:
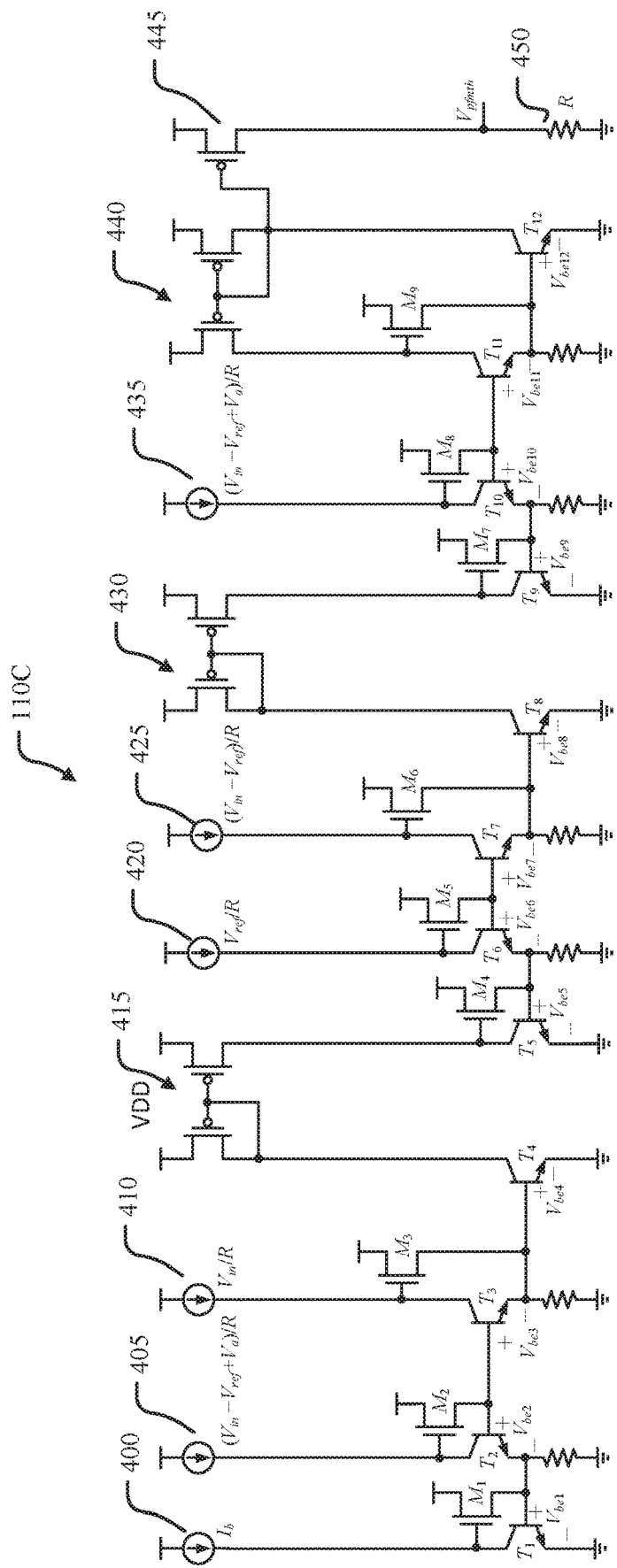
FIG. 5 illustrates the threshold generator (or second circuit) of FIG. 1 according to at least one example embodiment.

FIG. 5 illustrates the threshold generator (or second circuit) 110 of FIG. 1 according to at least one example embodiment.

The threshold generator 110C in FIG. 5 is similar to the threshold generator 110B, except that the nonlinear adaptive threshold generator 110C represents a low voltage version, which can generate a same or similar function for Vpfmth as the threshold generator 110B, but by using a lower supply voltage (e.g., 1.5V).

As shown in FIG. 5, the threshold generator 11C includes current sources 400, 405, 410, 420, 425, and 435 and current mirrors 415, 430, and 440. Current source 400 outputs a current Ib. Current source 405 outputs a current equal to (Vin−Vref+Va)/R, where Va is voltage used for the arbitrary slope of the compensation ramp and where R is a resistance value of resistance 450. Current source 410 outputs a current equal to Vin/R, and current source 420 outputs a current equal to Vref/R. Current source 425 outputs a current (Vin−Vref)/R, and current source 435 outputs a current equal to (Vin−Vref+Va)/R.

The threshold generator 110C includes an output transistor 445 to provide amplification for the signal Vpfmth. As shown, the current mirror 415 is powered by a supply signal VDD and although not explicitly shown, it should be understood that other components of FIG. 5 (e.g., M1 to M9, transistor 445, current mirrors 430, 440) may be powered by a power supply signal such as VDD.

Similar to the threshold generators 110A and 110B of FIGS. 3 and 4, FIG. 5 shows that the threshold generator 110C transistors M1-M9 that eliminate (or alternatively, reduce) the error due to low β common in CMOS processes used to manufacture the threshold generator 110C. The threshold generator 110C includes transistors T1, T2, T3, T4, T5, T6, T7, T8, T9, T10, T11, and T12 which allow the threshold generator 110C to perform multiplication and/or division functions to achieve a desired threshold signal Vpfmth.

In view of FIGS. 3-5, it should be appreciated that the circuits depicted for threshold generators 110A/B/C may be referred to as translinear circuits.

Figure 6:
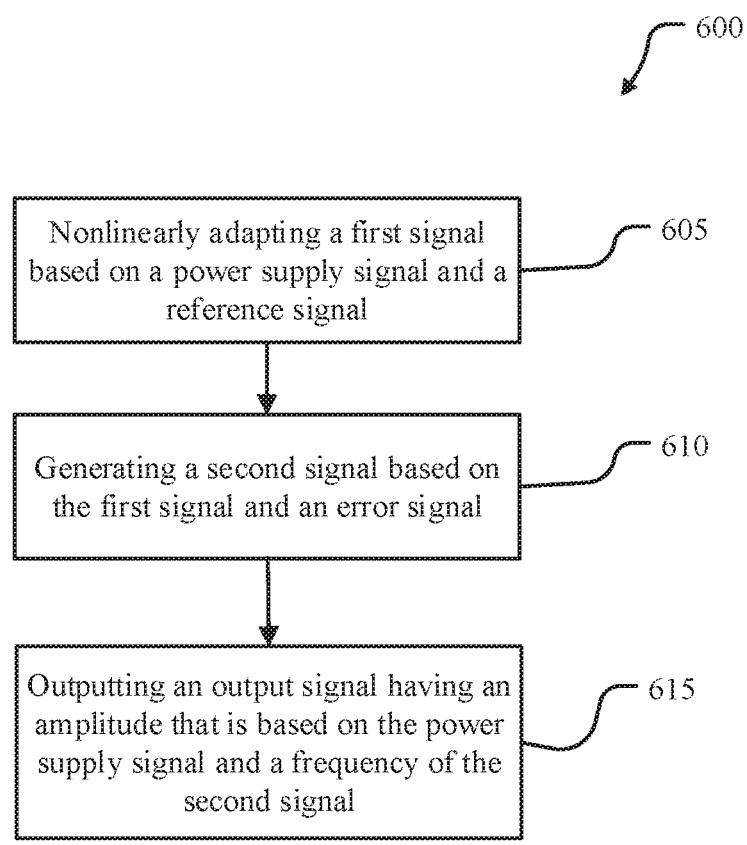
FIG. 6 illustrates example operations for operating the converter described with respect to FIGS. 1-5.

FIG. 6 illustrates example operations for controlling the converter 100 described with respect to FIGS. 1-5. While a general order for the steps of the method is shown in FIG. 6, the method 600 can include more or fewer steps or can arrange the order of the steps differently than those shown in FIG. 6. Generally, the method 600 starts at operation 605 and ends at operation 615. The method 600 can be executed as a set of computer-executable instructions executed by a computer system and encoded or stored on a computer readable medium. Alternatively, the operations discussed with respect to FIG. 6 may be implemented by the various elements of the converter 100 described with respect to FIGS. 1-5. Hereinafter, FIG. 6 shall be explained with reference to the systems, components, assemblies, devices, user interfaces, environments, software, etc. described in conjunction with FIGS. 1-5.

In operation 605, the method 600 includes nonlinearly adapting (e.g., by the threshold generator 110) a first signal (e.g., Vpfmth) based on a power supply signal (e.g., Vin) and a reference signal (e.g., Vref).

In operation 610, the method 600 includes generating (e.g., by the VCO 115) a second signal (e.g., Fclk in FIG. 2) based on the first signal and an error signal (e.g., Verr). Here, the error signal Verr is generated using the error amplifier 120 by comparing the reference signal Vref with the feedback signal of the converter 100. Verr may represent a difference between the reference signal Vref and the feedback signal that has been amplified by a gain of the error amplifier 120. Operation 610 is discussed in more detail below with reference to FIG. 7.

In operation 615, the method 600 includes outputting an output signal (e.g., Vout) having an amplitude that is based on the power supply signal Vin, a frequency of the second signal Fclk, and the sensed inductor current signal (e.g., Vsum). According to at least one embodiment, the feedback signal is a fed-back version of the output signal Vout. As noted above in the description of FIGS. 1-5, the first signal (Vpfmth) is independent of the feedback signal. That is, the fed-back version of Vout is not used to generate the first signal Vpfmth. As described above, the output signal Vout is used to supply power to the load 130.

In view of the above, it should be appreciated that the nonlinearly adapting the first signal in operation 605, the generating the second signal in operation 610, and the outputting the output signal in operation 615. Further, when the converter 100 is a buck converter, the amplitude of the output signal Vout may be less than the amplitude of the power supply signal Vin. Further still, in view of FIGS. 1-5, when the power supply signal Vin is a supply voltage and the reference signal Vref is a reference voltage, it may be said that operation 605 nonlinearly adapts the first signal Vpfmth as a function of the supply voltage Vin, the reference voltage Vref, and a scaling factor. In this case, the resistance R from FIGS. 3-5 may serve as the scaling factor.

Figure 7:
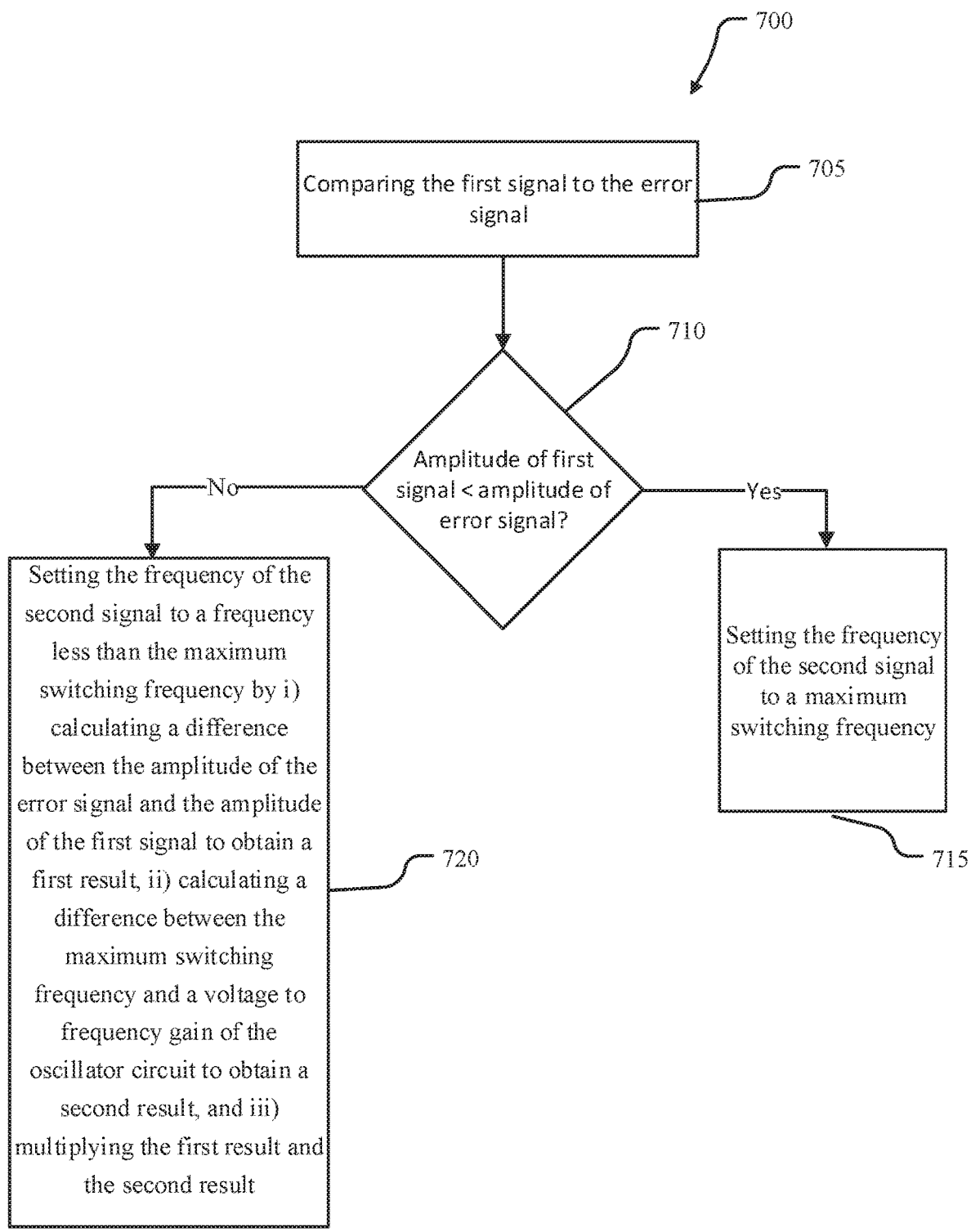
FIG. 7 illustrates example operations for generating the second signal in FIG. 6.

FIG. 7 illustrates example operations for generating the second signal (e.g., Fclk) in operation 610. While a general order for the steps of the method is shown in FIG. 7, the method 700 can include more or fewer steps or can arrange the order of the steps differently than those shown in FIG. 7. Generally, the method 700 starts at operation 705 and ends at operation 720. The method 700 can be executed as a set of computer-executable instructions executed by a computer system and encoded or stored on a computer readable medium. Alternatively, the operations discussed with respect to FIG. 7 may be implemented by the various elements of the converter 100 described with respect to FIGS. 1-5. Hereinafter, FIG. 7 shall be explained with reference to the systems, components, assemblies, devices, user interfaces, environments, software, etc. described in conjunction with FIGS. 1-5.

In operation 705, the method 700 compares the first signal Vpfmth to the error signal Verr. For example, an oscillator circuit (e.g., VCO 115) compares an amplitude of Vpfmth to an amplitude of Verr.

In operation 710, the method 700 determines whether the amplitude of the first signal Vpfmth is less than the amplitude of the error signal Verr. If so, the method 700 proceeds to operation 715, and sets the frequency of the second signal Fclk to a maximum switching frequency. Here, the maximum switching frequency refers to the maximum frequency of the VCO 115 a non-limiting example of which may be 1 MHz.

If operation 710 determines that the amplitude of Vpfmth is greater than or equal to the amplitude of Verr, the method 700 proceeds to operation 720, which sets the frequency of the second signal Fclk to a frequency less than the maximum switching frequency. According to at least one example embodiment, operation 720 determines the frequency of the second signal Fclk by i) calculating a difference between the amplitude of the error signal Verr and the amplitude of the first signal Vpfmth to obtain a first result, ii) calculating a difference between the maximum switching frequency of the oscillator circuit 115 and a voltage to frequency gain of the oscillator circuit 115 to obtain a second result, and iii) multiplying the first result and the second result to obtain the frequency. In other words, the transfer function of oscillator circuit 115 is expressed by $F_{CLK}=F_{PWM}$ if $V_{pfmth}<V_{err}$ and $F_{CLK}=F_{PWM}-K_{VCO}\times(V_{pfmth}-V_{err})$ if $V_{pfmth}\geq V_{err}$ where Kvco is an operating parameter, such as the voltage to frequency gain of the oscillator circuit 115.

It should be appreciated that FIGS. 1-7 have been described using terms such as first, second, third, etc., but that these terms are used for the convenience of explanation and do not limit example embodiments. For example, a particular element (e.g., a circuit, a signal, etc.) may be modified by the term "first" in one section of the description, but the same element may have a different modifier (e.g., "second") in another section of the description without limitation.

With reference to FIGS. 1-7 it should be understood that example embodiments provide a converter 100 that includes a first circuit 105. The first circuit 105 includes a first input that receives a power supply signal Vin, a second input 125 that receives a first signal Fclk, and a first output that outputs a second signal Vout having an amplitude that is based on a frequency of the first signal Fclk. The first signal Fclk is based on an error value (or error signal) Verr and a third signal Vpfmth. According to at least one example embodiment, the third signal Vpfmth is independent of feedback of the first circuit 105. The converter 100 further includes a second circuit 110 having a second output coupled to the second input 125 (e.g., through VCO 115) and that outputs the third signal Vpfmth. The second circuit 110 nonlinearly adapts the third signal Vpfmth based on the power supply signal Vin and a reference signal Vref.

According to at least one example embodiment, the converter 100 includes a third circuit 115 that that includes a third input that receives the error value Verr, a fourth input that receives the third signal Vpfmth, and a third output that outputs the first signal Fclk based on the third signal Vpfmth and the error value Verr. Here, the error value Verr is an error signal that generated by the error amplifier 120 by comparing the second signal Vout and the reference signal Vref. Verr may represent a difference between the reference signal Vref and the feedback signal that has been amplified by a gain of the error amplifier 120. The third circuit 115 compares the third signal Vpfmth to the error signal Verr, and adjusts the first signal Fclk based on the comparison. As noted in FIG. 2, the third circuit 115 includes a voltage controlled oscillator (VCO). According to at least one example embodiment, the third circuit 115 adjusts the first signal Fclk such that the first signal Fclk is at a first switching frequency if the comparison indicates that an amplitude of the error signal Verr is greater than or equal to an amplitude the third signal. On the other hand, the third circuit 115 adjusts the first signal Fclk such that first signal Fclk is at a second switching frequency that is less than the first switching frequency if the comparison indicates that the amplitude of the error signal Verr is less than the amplitude of the third signal Vpfmth. In this case, the first switching frequency is a maximum switching frequency of the VCO 115, and the second switching frequency is based on an operating parameter of the VCO 115, and a difference between the error signal Verr and the third signal Vpfmth. According to at least one example embodiment, the operating parameter of the VCO 115 is a voltage to frequency gain (Kvco) of the VCO 115.

It should be appreciated that when the converter 100 operates in a first mode (PFM mode), the amplitude of the second signal Vout is based on the frequency of the first signal Fclk, and when the converter 100 operates in a second mode (PWM mode), the amplitude of the second signal Vout is based on a width of pulses of the first signal Fclk.

As noted above, the second circuit 110 may be comprised of one of the translinear circuits from FIGS. 3-5, each of which include a first current source generating a first current Ib and a resistance R. In at least one example embodiment, the third signal Vpfmth is a function of the power supply signal Vin, the reference signal Vref, the first current Ib, and the resistance R. Here, the resistance R corresponds to a scaling factor for scaling the third signal Vpfmth.

Still referring to FIGS. 1-7, it should be understood that example embodiments provide a converter 100 that includes a first circuit 110 that nonlinearly adapts a first signal Vpfmth based on a power supply signal Vin and a reference signal Vref. The converter 100 includes a second circuit 115 that generates a second signal Fclk based on the first signal Vpfmth and an error signal Verr, where the error signal represents a difference between the reference signal Vref and a feedback signal. The converter 100 includes a third circuit 105 that outputs an output signal Vout having an amplitude that is based on the power supply signal Vin and a frequency of the second signal Fclk. Here, the feedback signal is a fed-back version of the output signal Vout, and the first signal Vpfmth is independent of the feedback signal.

In view of the foregoing description, it should be understood that example embodiments are directed to converters and methods of controlling converters that reduce voltage ripple of the converter output and/or improve power conversion efficiency. As a result of the improvement in power conversion efficiency, battery life of a power supply for the converter may be extended. Further, the reduction in voltage ripple relaxes the supply rejection requirements of downstream circuits. For example, for a given minimum supply voltage specification of a load of the converter, the average output voltage of the converter is set to a relatively lower level (due to reduced voltage ripple), which reduces power consumption and further extends the battery life of the converter's power supply.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A converter, comprising:
    a first circuit including:
        a first input that receives a power supply signal;
        a second input that receives a first signal; and
        a first output that outputs a second signal having an amplitude that is based on a frequency of the first signal, wherein the first signal is based on an error value and a third signal, and wherein the third signal is independent of feedback of the first circuit second signal;
    a second circuit having a second output coupled to the second input and that outputs the third signal, wherein the second circuit nonlinearly adapts the third signal based on the power supply signal and a reference signal;
    a third circuit that includes a third input that receives the error value, a fourth input that receives the third signal, and a third output that outputs the first signal based on the third signal and the error value, wherein the error value is an error signal that represents a difference between the second signal and the reference signal, and wherein the frequency of the first signal varies to vary the amplitude of the second signal; and
    wherein, in a first mode, the amplitude of the second signal is based on the frequency of the first signal, and, in a second mode, the amplitude of the second signal is based on a time between the first circuit receiving a rising edge of the first signal and the first circuit receiving a rising edge of a reset signal, or
    wherein, in the first mode, the third circuit adjusts the first signal such that the first signal is at a first switching frequency if a comparison of the third signal to the error signal indicates that an amplitude of the error signal is greater than an amplitude of the third signal, and, in the second mode, the third circuit adjusts the first signal such that first signal is at a second switching frequency that is less than the first switching frequency if the comparison indicates that the amplitude of the error signal is less than the amplitude of the third signal.

2. The converter of claim 1, wherein the third circuit compares the third signal to the error signal, and adjusts the first signal based on the comparison.

3. The converter of claim 2, wherein the third circuit includes a voltage controlled oscillator.

4. The converter of claim 3, wherein the first switching frequency is a maximum switching frequency of the voltage controlled oscillator.

5. The converter of claim 3, wherein the second switching frequency is based on an operating parameter of the voltage controlled oscillator, and a difference between the error signal and the third signal.

6. The converter of claim 5, wherein the operating parameter is a voltage to frequency gain of the voltage controlled oscillator.

7. The converter of claim 1, wherein the second circuit includes a translinear circuit.

8. The converter of claim 7, wherein the translinear circuit includes a first current source generating a first current and a resistance, and wherein the third signal is based on the power supply signal, the reference signal, the first current, and the resistance.

9. The converter of claim 8, wherein the resistance corresponds to a scaling factor for scaling the third signal.

10. A method for controlling a converter, comprising:
    nonlinearly adapting a first signal based on a power supply signal and a reference signal;
    generating, by an oscillator circuit, a second signal based on the first signal and an error signal, the error signal representing a difference between the reference signal and a feedback signal, wherein the generating comprises:
        setting, in a first mode, a frequency of the second signal to a maximum switching frequency of the oscillator circuit if an amplitude of the first signal is less than an amplitude of the error signal, and
        setting, in a second mode, the frequency of the second signal to a frequency less than the maximum switching frequency when the amplitude of the first signal is greater than or equal to the amplitude of the error signal; and
    outputting an output signal having an amplitude that is based on the power supply signal and the frequency of the second signal, wherein the feedback signal is a fed-back version of the output signal, wherein the first signal is independent of the feedback signal, and wherein the amplitude of the output signal varies according to the frequency of the second signal.

11. The method of claim 10, wherein the generating further comprises: comparing the first signal to the error signal; and determining whether the amplitude of the first signal is less than the amplitude of the error signal.

12. The method of claim 11, wherein the setting the frequency of the second signal to the frequency that is less than the maximum switching frequency further comprises calculating the frequency of the second signal by:
  calculating a difference between the amplitude of the error signal and the amplitude of the first signal to obtain a first result;
  calculating a difference between the maximum switching frequency and a voltage to frequency gain of the oscillator circuit to obtain a second result; and
  multiplying the first result and the second result.

13. The method of claim 10, wherein the nonlinearly adapting the first signal, the generating the second signal, and the outputting the output signal are performed in a pulse frequency modulation mode of the converter.

14. The method of claim 13, wherein the amplitude of the output signal is less than the amplitude of the power supply signal.

15. The method of claim 10, wherein the power supply signal is a supply voltage and the reference signal is a reference voltage, and wherein the nonlinearly adapting the first signal further comprises:
  nonlinearly adapting the first signal as a function of the supply voltage, the reference voltage, and a scaling factor.

16. A converter, comprising:
  a first circuit that nonlinearly adapts a first signal based on a power supply signal and a reference signal;
  a second circuit that generates a second signal based on the first signal and an error signal, the error signal representing a difference between the reference signal and a feedback signal;
  a third circuit that outputs an output signal having an amplitude that is based on the power supply signal and a frequency of the second signal, wherein the feedback signal is a fed-back version of the output signal, wherein the first signal is independent of the feedback signal, and wherein the amplitude of the output signal varies according to the frequency of the second signal; and
  wherein, in a first mode, the second circuit adjusts the second signal such that the second signal is at a first switching frequency when an amplitude of the error signal is greater than an amplitude of the first signal, and, in a second mode, the second circuit adjusts the second signal such that second signal is at a second switching frequency that is less than the first switching frequency when the amplitude of the error signal is less than the amplitude of the first signal.

* * * * *